(12) United States Patent  (10) Patent No.: US 12,547,028 B2
Pyo et al.  (45) Date of Patent: Feb. 10, 2026

(54) COLOR FILTER HAVING QUANTUM DOT COLOR CONVERSION STRUCTURE, DISPLAY DEVICE INCLUDING SAME, AND MANUFACTURING METHOD THEREFOR

(71) Applicant: KOREA ELECTROTECHNOLOGY RESEARCH INSTITUTE, Changwon-si (KR)

(72) Inventors: Jaeyeon Pyo, Changwon-si (KR); Jongcheon Bae, Busan (KR); Jung Hyun Kim, Buchen-si (KR); Seung Kwon Seol, Namyangju-si (KR)

(73) Assignee: KOREA ELECTROTECHNOLOGY RESEARCH INSTITUTE, Changwon-si (KR)

( * ) Notice: Subject to any disclaimer, the term of this patent is extended or adjusted under 35 U.S.C. 154(b) by 756 days.

(21) Appl. No.: 17/755,460

(22) PCT Filed: Oct. 22, 2020

(86) PCT No.: PCT/KR2020/014506
§ 371 (c)(1),
(2) Date: Oct. 11, 2022

(87) PCT Pub. No.: WO2021/085934
PCT Pub. Date: May 6, 2021

(65) Prior Publication Data
US 2023/0015760 A1   Jan. 19, 2023

(30) Foreign Application Priority Data
Nov. 1, 2019 (KR) .................. 10-2019-0138439

(51) Int. Cl.
*G02F 1/1335* (2006.01)
*B29C 64/112* (2017.01)
(Continued)

(52) U.S. Cl.
CPC ...... *G02F 1/133514* (2013.01); *B29C 64/112* (2017.08); *B29D 11/00634* (2013.01);
(Continued)

(58) Field of Classification Search
None
See application file for complete search history.

(56) References Cited

U.S. PATENT DOCUMENTS

2004/0118448 A1* 6/2004 Scher ............... B82Y 30/00
  136/265
2012/0291862 A1* 11/2012 Jiawook ............ H10F 77/48
  977/948

(Continued)

FOREIGN PATENT DOCUMENTS

JP   2014179368 A   *  9/2014
JP   2018-25802 A   2/2018
(Continued)

OTHER PUBLICATIONS

Machine translation JP2014-179368 (Year: 2014).*
International Search Report by Korean Intellectual Property Office for PCT/KR2020/014506 dated Feb. 18, 2021.

*Primary Examiner* — Alexandre F Ferre
(74) *Attorney, Agent, or Firm* — BROADVIEW IP LAW, PC

(57) ABSTRACT

The present invention relates to a color filter having a quantum dot color conversion structure and a manufacturing method therefor. The present invention relates to a color filter having a plurality of quantum dot color conversion layers spaced apart from each other, wherein each of the quantum dot color conversion layers is a free-standing wire structure extending in a vertical direction from a substrate, and the ratio of the length to the width of the free-standing wire structure is 1 or more.

10 Claims, 15 Drawing Sheets

(51) Int. Cl.
    *B29D 11/00*     (2006.01)
    *B33Y 10/00*     (2015.01)
    *B33Y 80/00*     (2015.01)

(52) U.S. Cl.
    CPC ............... *B33Y 10/00* (2014.12); *B33Y 80/00* (2014.12); *G02F 2202/36* (2013.01)

(56) References Cited

U.S. PATENT DOCUMENTS

| | | |
|---|---|---|
| 2012/0298401 A1 | 11/2012 | Je et al. |
| 2017/0168203 A1 | 6/2017 | Do et al. |
| 2018/0045866 A1 | 2/2018 | Chae et al. |
| 2018/0074401 A1 | 3/2018 | Nam et al. |
| 2019/0276688 A1 | 9/2019 | Seol et al. |
| 2020/0032137 A1* | 1/2020 | Watano ................... B32B 27/18 |

FOREIGN PATENT DOCUMENTS

| | | |
|---|---|---|
| KR | 10-2016-0000281 A | 1/2016 |
| KR | 10-2017-0071660 A | 6/2017 |
| KR | 10-2018-0010560 A | 1/2018 |
| KR | 10-2018-0030353 A | 3/2018 |
| WO | 2011/090226 A1 | 7/2011 |

* cited by examiner

5μm

5μm

5μm

1μm

1μm

COLOR FILTER HAVING QUANTUM DOT COLOR CONVERSION STRUCTURE, DISPLAY DEVICE INCLUDING SAME, AND MANUFACTURING METHOD THEREFOR

CROSS-REFERENCE TO RELATED APPLICATIONS

This application is a National Phase Entry Application of PCT Application No. PCT/KR2020/014506 filed on Oct. 22, 2020, which claims priority to Korean Patent Application No. 10-2019-0138439 filed on Nov. 1, 2019, in Korean Intellectual Property Office, the entire contents of which are hereby incorporated by reference in its entirety.

TECHNICAL FIELD

The present disclosure relates to a color filter having a quantum dot color conversion structure, and a method for manufacturing the same.

BACKGROUND ART

A liquid crystal display device includes a pixel electrode, a common electrode, and a liquid crystal layer therebetween. A voltage is applied between the pixel electrode and the common electrode, an electric field is generated in the liquid crystal layer, thereby determining the orientation of liquid crystal molecules of the liquid crystal layer, and polarization of incident light is controlled, thereby displaying images.

Such a conventional liquid crystal display device implements images by light that has passed through a red color filter, a green color filter, and a blue color filter, the light being emitted by a backlight by using white light as a light source to form colors, and has a problem in that optical efficiency is low, because each color filter reduces the amount of light by about ⅓.

In order to alleviate such degradation in optical efficiency and to implement a high level of color reproductivity, a quantum dot liquid crystal display device (QDLCD) employing a quantum dot color filter (ADCF) has been proposed.

FIG. 1 schematically illustrates the structure of a conventional quantum dot color filer liquid crystal display device.

Referring to FIG. 1, the quantum dot liquid crystal display device includes a backlight unit 40, a TFT substrate 30, a liquid crystal module 20, and a quantum dot color filter 10.

This device is a liquid crystal display device having a quantum dot color conversion layer applied to a color filter used for a conventional liquid crystal display device, and implements imaged by directing excitation light in a low-wavelength band (for example, ultraviolet rays or blue light) from the backlight unit 40 into the color filter 10 and synthesizing light that has undergone wavelength conversion through quantum dot color conversion layers 12, 14, 16. In order to pattern quantum dot color conversion layers in connection with conventional emissive color filters, techniques such as inkjet printing, transfer printing, and lithography have been applied. However, conventional manufacturing techniques have limitations in that they have difficulty in satisfying the demands for small sizes and high resolutions of pixels.

DISCLOSURE OF INVENTION

Technical Problem

It is an aspect of the present disclosure to provide a quantum dot color filter capable of implementing a high level of luminance even at a high resolution.

It is another aspect of the present disclosure to provide a quantum dot color filter having a line width of a sub-micrometer or micrometer level.

It is another aspect of the present disclosure to provide a quantum dot color filter including a quantum dot structure having a high aspect ratio.

It is another aspect of the present disclosure to provide a method for manufacturing the above-mentioned quantum dot color filter.

It is another aspect of the present disclosure to provide a display device having the above-mentioned quantum dot color filter.

Solution to Problem

In order to solve the above-mentioned technical problems, the present disclosure provides a color filter including multiple quantum dot color conversion layers spaced apart from each other, wherein the quantum dot color conversion layers are free-standing wire structures configured to extend in a vertical direction from a substrate, and the ratio of the length to the width of the free-standing wire structures is one or more.

In the present disclosure, the multiple quantum dot color conversion layers may include: a first free-standing structure configured to convert excitation light of a first peak wavelength into emission light of a second peak wavelength; and a second free-standing structure configured to convert excitation light of the first peak wavelength into emission light of a third peak wavelength. In addition, the multiple quantum dot color conversion layers may further include a third free-standing structure configured to transmit excitation light of the first peak wavelength, and the third free-standing structure may be made of a transparent material.

In addition, in the present disclosure, the ratio of the length to the width may be two or more. In addition, the ratio of the length to the width may be five or more, or 10 or more.

In the present disclosure, the free-standing wire structures each may include a body portion configured to have a small width compared to a foot portion thereof. Differently thereto, the free-standing wire structures each may include a foot portion and a body portion configured to have substantially the same width.

In the present disclosure, the width of the body portion may be less than one micron.

In order to solve other technical problems described above, the present disclosure provides a method for manufacturing a color filter including multiple quantum dot color conversion layers spaced apart from each other, the method including forming a free-standing wire structure on a substrate so as to extend in the vertical direction from the substrate, wherein the ratio of the length to the width of the free-standing wire structure is one or more.

In the present disclosure, the forming the free-standing wire structure may include discharging ink through a nozzle and repositioning the nozzle with regard to a substrate without interruption of ink discharge such that a meniscus is formed between the nozzle and the substrate the ink, and then forming the free-standing wire structure through evaporation of a solvent in the meniscus.

Advantageous Effects of Invention

According to the present disclosure, a quantum dot color filter capable of implementing a high level of luminance even at a high resolution may be provided. In addition, according to the present disclosure, a color filter manufacturing method appropriate for manufacturing a quantum dot structure having a high aspect ratio with a line width of a sub-micrometer or micrometer level may be provided.

BEST MODE FOR CARRYING OUT THE INVENTION

Hereinafter, the present disclosure will be described in detail by describing a preferable embodiment of the present disclosure.

Figure 1:
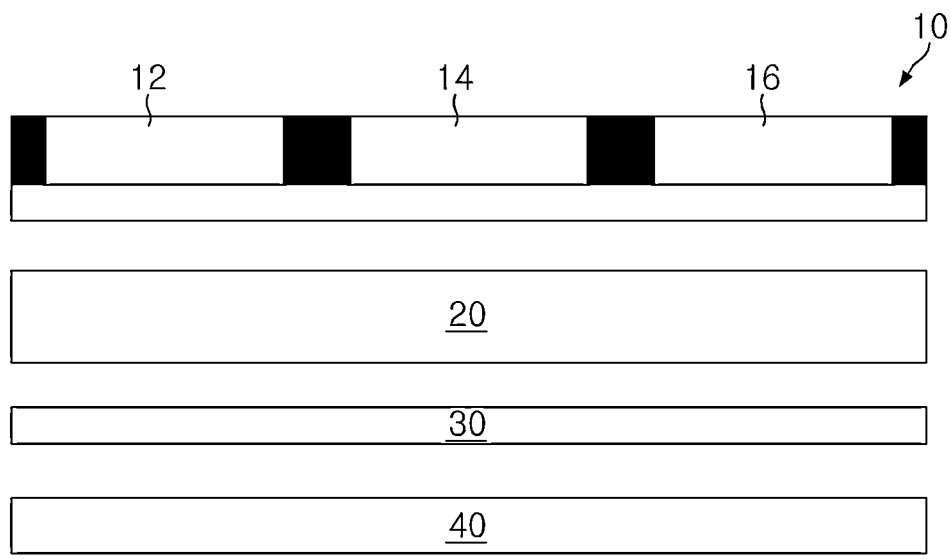
FIG. 1 is a view schematically illustrating a module structure constituting a conventional quantum dot liquid crystal display.
Figure 2:
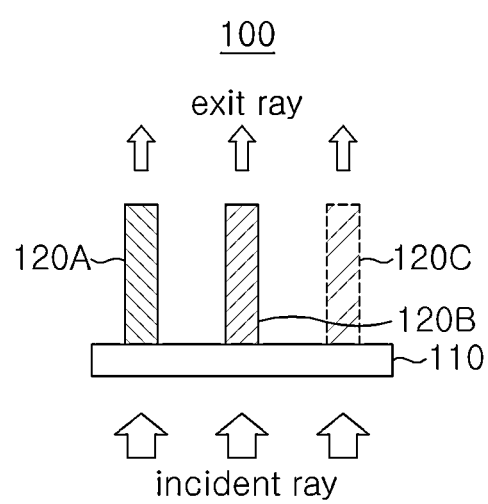
FIG. 2 is a view schematically illustrating a color filter including a quantum dot color conversion structure according to an embodiment of the present disclosure.

FIG. 2 is a view schematically illustrating a quantum dot color filter according to an embodiment of the present disclosure.

Referring to FIG. 2, a color filter 100 may include a substrate 110 and multiple free-standing wire structures 120A, 120B, and 120C configured to extend upward on the substrate 110. The multiple free-standing wire structures 120A, 120B, and 120C may be configured to emit light of different wavelengths. For example, a first free-standing wire structure 120A may be configured emit red light, a second free-standing wire structure 120B may be configured to emit green light, and a second free-standing wire structure 120C may be configured to emit blue light. The free-standing wire structures may be a repeating unit of the color filter. For example, three free-standing wire structures constituting a group may be two-dimensionally repeatedly arranged on the plane of the substrate while forming a row and column so as to constitute the color filter.

In the present disclosure, at least some of the free-standing wire structures may be a color conversion structure. For example, the first free-standing wire structure 120A may be configured to be excited by an incident ray so as to emit light of a wavelength corresponding to red color, and the second free-standing wire structure 120B may be configured to be excited by an incident ray so as to emit light of a wavelength corresponding to green color.

In addition, the third free-standing wire structure 120C may be implemented as a quantum dot color conversion structure or a light-transmitting structure. For example, when an incident ray is UV light, the third free-standing wire structure 120C may be configured to convert UV light into blue light. Alternatively, when the incident ray is blue light, the third free-standing wire structure 120C may be implemented as a light-transmitting material so as to transmit blue light. For example, the wire structure 120C may be implemented as a light-transmitting material such as air or a transparent resin.

In the present disclosure, the free-standing wire structure may include a support body for maintaining the shape of the structure and quantum dots dispersed in the support body. In the present disclosure, the support body of the free-standing wire structure may be made of a light-transmitting resin. For example, the support body constituting the free-standing wire may include at least one polymer selected from a group including polystyrene, polymethyl methacrylate, polycaprolactone, and polydimethylsiloxane.

Figure 3:
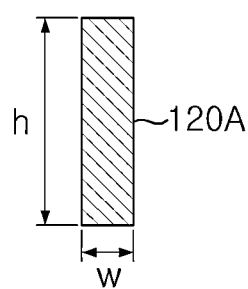
FIG. 3 is a view showing a geometric shape of the color quantum dot color conversion structure of FIG. 2.

FIG. 3 is a view showing a geometric shape of the free-standing wire structures of FIG. 2.

Referring to FIG. 3, the free-standing wire structure may have an elongated shape. For example, the free-standing wire structures may have a ratio of a height h to a width w, that is, an aspect ratio the lower limit of which is one, two, three, four, five, or ten. The free-standing wire having a high aspect ratio perpendicular to the surface of the substrate may be configured to improve the brightness of emission light per unit pixel area due to the total amount of quantum dots which increase the total volume of the light conversion layer and increase in proportion to the volume thereof.

In addition, the upper limit of the aspect ratio of the free-standing wire structures may be limited in some cases. Due to process reasons, an alignment problem may occur between a head portion and a foot portion of the free-standing structure having a high aspect ratio, and misalignment of the free-standing structure may cause interference with adjacent pixels. Accordingly, the upper limit of the aspect ratio of the free-standing wire structures may be limited to 5, 10, 15, or 20 according to process parameters. In the present disclosure, the free-standing structure may be configured to have a constant or non-constant width in the longitudinal direction thereof. In the present disclosure, when having a non-constant width in longitudinal direction, the aspect ratio of the free-standing structure may be defined as the ratio of height to width having a maximum value. For example, the width may be the width of the foot portion.

In the present disclosure, the width w of the free-standing structure may be one of the main variables affecting the resolution of the color filter. As will be described later, the present disclosure may be configured such that a printing ink is discharged by the surface tension of a meniscus without an external pressure so as to suppresses a spreading of the ink passing through a nozzle aperture as much as possible, and may be configured to control the movement speed of a nozzle so as to prevent the width of a printed structure from increasing. Accordingly, the present disclosure enables a free-standing structure having a width of sub-micrometers or several micrometers to be manufactured.

On the other hand, although not illustrated or described separately, the color filter of the present disclosure may further include a partition wall between the free-standing wire structures, which is in contact with or in non-contact with the free-standing wire structures. It may be obvious to a person skilled in the art, which keeps in touch with the technical idea of the present disclosure, that in the present disclosure, the partition wall is not necessarily an essential element. In addition, the color filter of the present disclosure may be provided with a black matrix at an appropriate position such as the surface of the surface between the free-standing wire structures.

Figure 4:
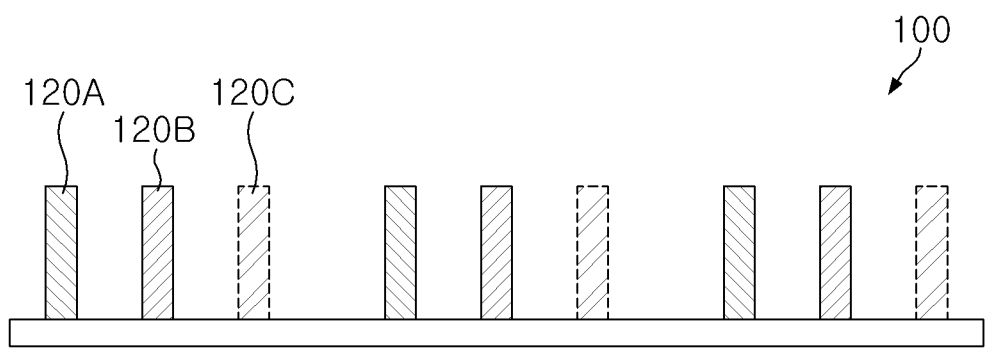
FIG. 4 is a view schematically illustrating a quantum dot liquid crystal display device according to an embodiment of the present disclosure.

FIG. 4 is a view schematically illustrating the structure of a display device including a color filter according to an embodiment of the present disclosure.

Referring to FIG. 4, a display device may include a color filter 100, a liquid crystal 200, a drive substrate 300, and a back-light unit 400.

In the illustrated display device, the back-light unit 400 may include a light source configured to provide excitation light or transmitted light of the display device. Blue light or UV light may be used as the light source of the back-light unit. The liquid crystal 200 and the drive substrate 300 may be configured to drive the liquid crystal so as to deliver the light provided from the back-light unit to the color filter.

The color filter 100 may include multiple free-standing structures. Three free-standing wire structures 120A, 120B, and 120C, which constitutes one pixel, may be two-dimensionally arranged on the substrate in rows and columns. The number of free-standing wire structures may change according to the number of sub-pixels constituting a pixel.

In the present disclosure, at least some or all of the free-standing wire structures 120A, 120B, and 120C may be a color conversion structure which changes color of light from a back-light unit and then emits same. As described above, when blue light is used as a light source, some of the free-standing wire structures may not be a color conversion structure, and for example, a free-standing wire made of a transparent material may be used or an empty space may be formed, so as to transmit light.

Although the liquid crystal display has been described above as an example, the color filter of the present disclosure may be applied to other display devices. For example, the color filter of the present disclosure may be applicable to a quantum dot OLED. A quantum dot OLED may have an OLED as a light source instead of a back-light module, and may be configured to color-change light generated in an OLED into light of a different wavelength so as to implement an image. In addition, a quantum dot OLED may be provided with an OLED light source of a sub-pixel unit and color conversion layer, and may be configured to turn on/off the OLED light source so as to change color thereof. Therefore, the color of a pixel can be implemented.

Hereinafter, a method for manufacturing a free-standing structure of the present disclosure will be described.

Figure 5A:
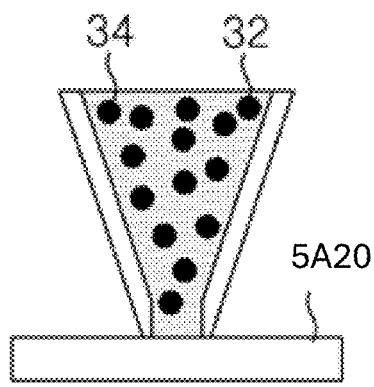
FIG. 5A to FIG. 5C are views schematically illustrating a 3D printing mechanism according to an embodiment of the present disclosure.
Figure 5B:
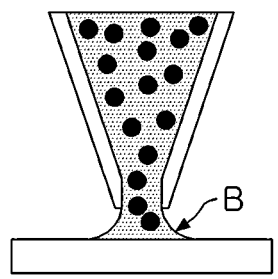
Figure 5C:
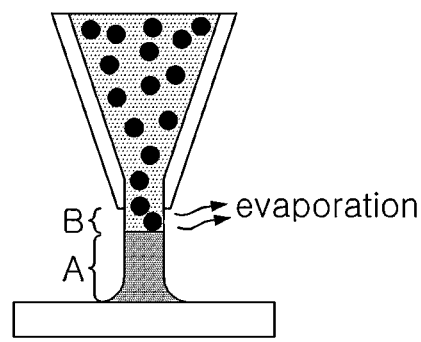
Figure 6A:
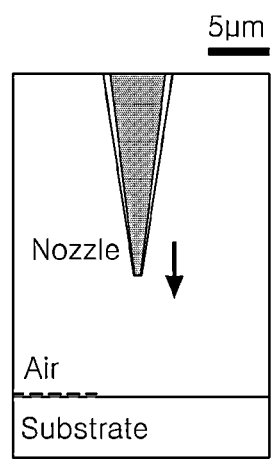
FIG. 6A to FIG. 6G are views schematically illustrating a 3D printing procedure of a quantum dot color conversion layer according to an embodiment of the present disclosure.
Figure 6B:
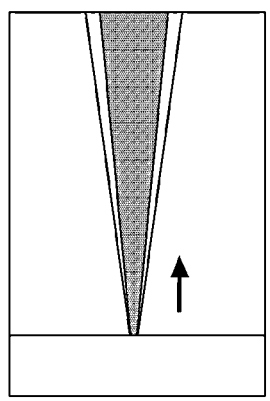
Figure 6C:
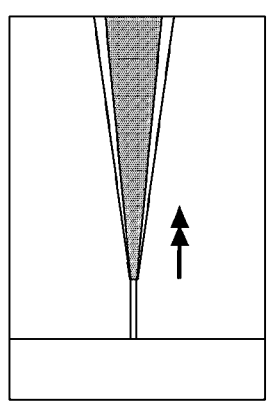
Figure 6D:
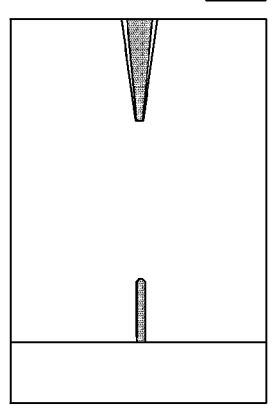
Figure 6E:
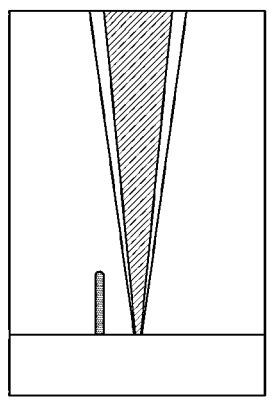
Figure 6F:
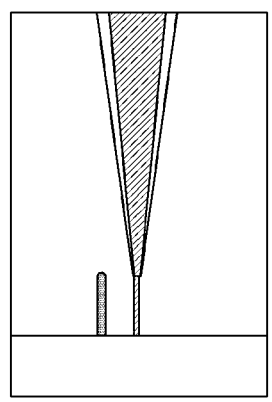
Figure 6G:
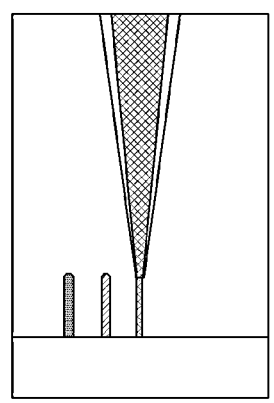
Figure 7A:
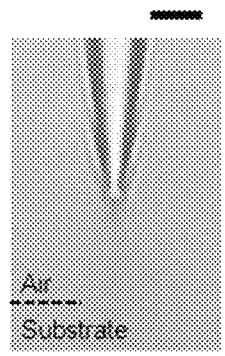
FIG. 7A to FIG. 7G are photographs showing a 3D printing procedure of a quantum dot color conversion layer according to an embodiment of the present disclosure.
Figure 7B:
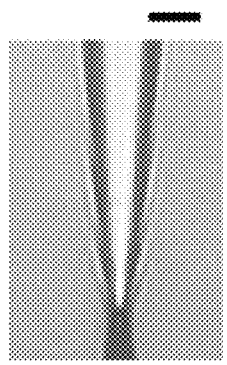
Figure 7C:
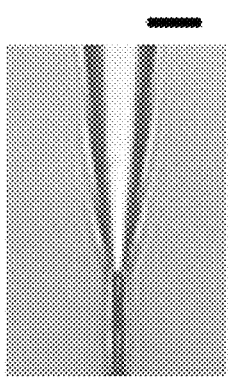
Figure 7D:
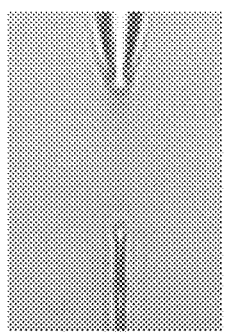
Figure 7E:
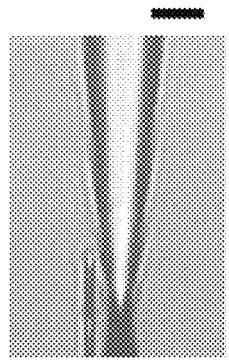
Figure 7F:
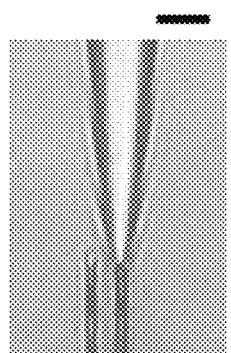
Figure 7G:
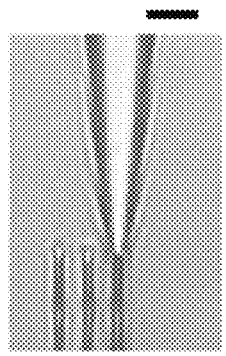

FIG. 5A to 5C are views schematically illustrating a printing method according to an embodiment of the present disclosure.

FIG. 5A to 5C are a concept view illustrating in more detail an operation process of a printing pen 110 for printing free-standing wire structures according to an embodiment of the present disclosure.

FIG. 5A illustrates an initial state in which a nozzle tip of the pen is in contact with the substrate 5A20 and the nozzle. The pen may have an ink stored therein, which includes a quantum dot powder 32, a polymer (not shown), and a solvent 34 for dissolving the polymer and mixing the quantum dot powder.

When the pen moves upward by a predetermined distance from the state of FIG. 5A, a meniscus B of the ink may be formed in the gap between the nozzle and the substrate. In the state, when the pen 110 moves upward at a predetermined speed, the ink may be discharged from the nozzle. At this time, the meniscus B, on which surface tension by the ink in a solution state acts, may be formed at the nozzle side, and a structure A including a quantum dot powder and a polymer may be formed at the substrate side by evaporation of the solvent 34. In the present disclosure, the solvent in the meniscus B may evaporate spontaneously even at room temperature due to having a high specific surface area. In some cases, in the present disclosure, it may not be excluded that an appropriate heating means is added during the operation process of the pen or cross-linkage is performed by ultraviolet irradiation. In the present disclosure, the formation of the meniscus and the evaporation of the solvent may occur almost simultaneously, and in a very short time, a structure, which is supported by the polymer, may be formed by the quantum dot powder.

In the present disclosure, in order to provide a high specific surface area for evaporation of the solvent, the width of the meniscus may be maintained within an appropriate range. In the present disclosure, the width of the meniscus may depend on the aperture of the nozzle and the movement speed of the nozzle. In addition, since a quantum dot powder flows in a meniscus conduit, the line width of a quantum dot pattern resulting therefrom may have a value equal to or smaller than the width d of the meniscus.

Referring again to FIG. 5A to 5C, the meniscus may have a predetermined width d at a predetermined movement speed v. However, as the movement speed increases, the meniscus may have a smaller width. This relationship may be expressed by the following formula, which is so-called material balance law.

$$r = [W(v)/(dv)]^{1/2}$$

(Here, the r is the radius of the meniscus, the v is the movement speed of the nozzle, and the W is the flow speed of the ink.)

In an embodiment of the present disclosure, in order for continuous printing of a free-standing structure pattern, the flow characteristics of the ink need to be controlled.

For this reason, the present disclosure may be configured to adjust the base polymer content so as to control the flow characteristics of the ink. In contrast, the present disclosure may also be configured to introduce an additional rheological modifier so as to control the flow characteristics of the ink.

In the present disclosure, at least one polymer selected from the group including polystyrene, polymethyl methacrylate, polycaprolactone, and polydimethylsiloxane may be used as the polymer. In the present disclosure, the base polymer may be configured to support the quantum dot powder and provide adhesive force to the substrate.

As the polymer or the rheological modifier content increases, the viscosity of the ink may be increased, and the flow characteristics thereof may be controlled by adjusting the polymer or the rheological modifier content. Preferably, in the present disclosure, it may be preferable that the ink exhibits Newtonian behavior. In addition, the present disclosure may be configured to use an ink exhibiting shear thinning properties in which the viscosity decreases as the shear stress increases. In this case, it may be preferable that the ink exhibits a liquid-like behavior upon shear deformation.

Although the 3D printing method based on meniscus guided printing using the spontaneous discharge mechanism by the surface tension of the ink has been described above, the present disclosure may not be limited thereto, and the structure may be formed by pressure discharge.

MODE FOR CARRYING OUT THE INVENTION

Experimental Example 1: Manufacture of Ink

After preparing CdSe/ZnS Quantum dot (QD) powders having emission wavelengths of 650 nm, 540 nm, and 480 nm purchased from PlasmaChem, each of quantum dot powders is dispersed in a xylene solvent at a concentration of 0.5 mg/mL so as to manufacture three types of quantum dot solutions. Separately, a polystyrene powder is dissolved in a xylene solvent at a concentration of 2 wt % so as to manufacture a polystyrene solution. The manufactured quantum dot solution is diluted with the polystyrene solution such that the quantum dot powder becomes 20 parts by weight with respect to 100 parts by weight of the polystyrene powder. The diluted solution is ultrasonically dispersed for about 5 minutes so as to manufacture a red Quantum dot ink, a green Quantum dot ink, and a blue Quantum dot ink.

The manufactured ink is designed at a very low concentration in order for smooth spontaneous discharge, and exhibits Newtonian behavior when the viscosity of the solution is very low.

Experimental Example 2: Manufacture of Quantum Dot Color Conversion Structure A micro-pipette nozzle is manufactured to have an aperture diameter of 600 nm by using a P-2000 nozzle puller of Sutter Instrument Company so as to manufacture a free-standing structure on a quartz substrate. Specifically, the free-standing structure is manufactured by filling the Quantum dot ink manufactured in Experimental example 1 into the micro-pipette, bring the nozzle tip into contact with the substrate at the desired position of the quartz substrate, moving the nozzle upward, and then continuously discharging the ink through the nozzle tip so as to form the free-standing structure having a desired shape, and the 3D printing of the free-standing structure is completed by evacuating the nozzle at high speed. At this time, the ink is discharged from the tip thereof without any external force other than the surface tension of the meniscus, and the solvent of the discharged ink is evaporated at room temperature. The position and pulling speed of the micro-pipette may be precisely controlled using a 3-axis stepping motor, with a position accuracy of 100 nm.

By the method described above, three types of quantum dot color conversion layers having a free-standing wire shape are formed on the substrate by using three types of quantum dot (QD) inks having different emission wavelengths of 650 nm, 540 nm, and 480 nm.

FIG. 6A to 6G are views schematically illustrating a process of forming a free-standing structure on a substrate by using three types of red, green, and blue inks, and FIGS. 7A to 7G are photographs showing the actual manufacturing process thereof.

Figure 8A:
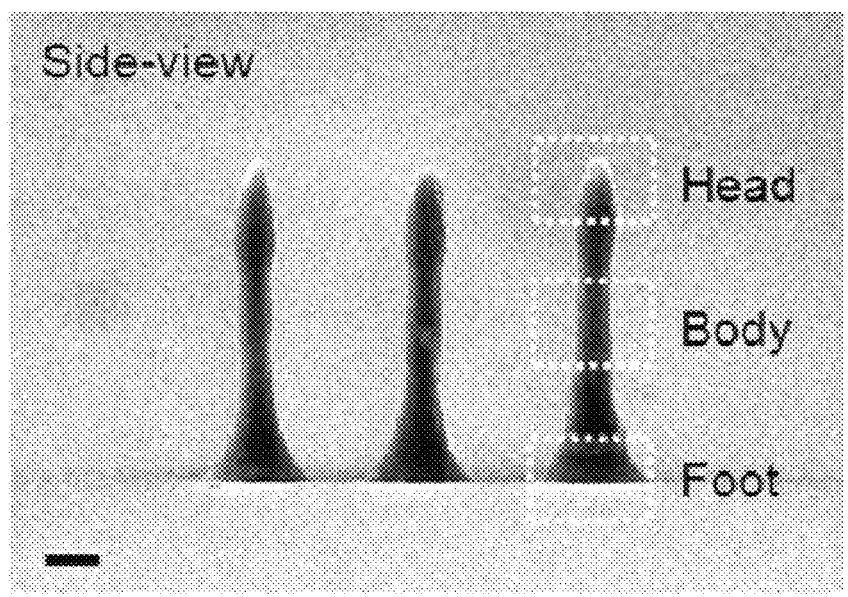
FIG. 8A to FIG. 8C are photographs, which are taken by an electron microscope, showing a quantum dot color conversion structure manufactured according to an embodiment of the present disclosure.
Figure 8B:
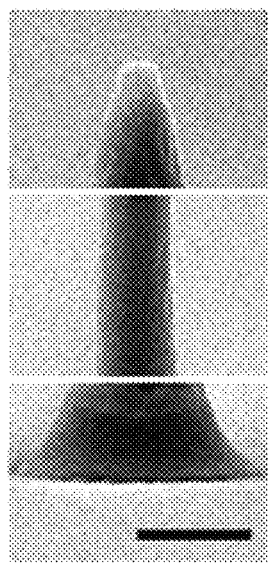
Figure 8C:
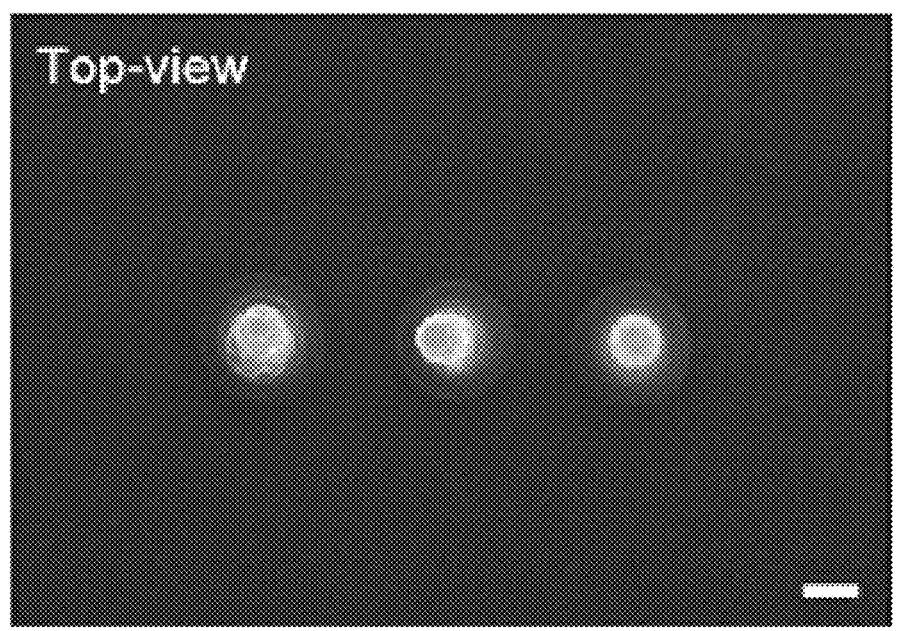

FIG. 8A to FIG. 8C are SEM photographs of observing the free-standing wire structures manufactured in Experimental example 2.

Referring to FIG. 8A, the free-standing wire structures may have a length of about 6 micrometers, and may be divided into the foot portion, a body portion, and the head portion according to the geometric shape thereof. The foot portion may be formed when the nozzle tip is in contact with the substrate, and may have a width slightly larger than the nozzle diameter, and the foot portion having a wide width compared to the nozzle may help to improve the stability of the structure and the adhesive force to the substrate. On the other hand, the body portion may be formed by a movement of the nozzle after the nozzle tip and the substrate are in contact with each other. In addition, the body portion may have a width substantially equal to or smaller than the diameter of a micro-nozzle, and the width may be adjusted according to the movement speed of the nozzle. For example, a meniscus having a small width may be implemented by increasing the movement speed of the nozzle, and thus a body portion having a width of ⅒ of the nozzle diameter may be also implemented. The head portion may be formed in the print finishing process, and the shape thereof may be determined by the flow characteristics of the ink and a movement of the evacuation step.

FIG. 8C is a plan photograph of a free-standing wire structure. From the circle formed by the head portion and the circle formed by the foot portion in the photograph, the degree of alignment of the free-standing wire structures may be identified, and the offset between the centers of the two circles, which is calculated from the photograph, is at the maximum of 0.37 μm. That is, it may be known that an offset less than about 5% occurs in a free-standing structure having a length of 6 μm.

Experimental Example 3: Characteristic Evaluation of Quantum Dot Color Conversion Structure Optical properties of the free-standing structure sample are measured using the device illustrated in FIG. 9A.

Figure 9A:
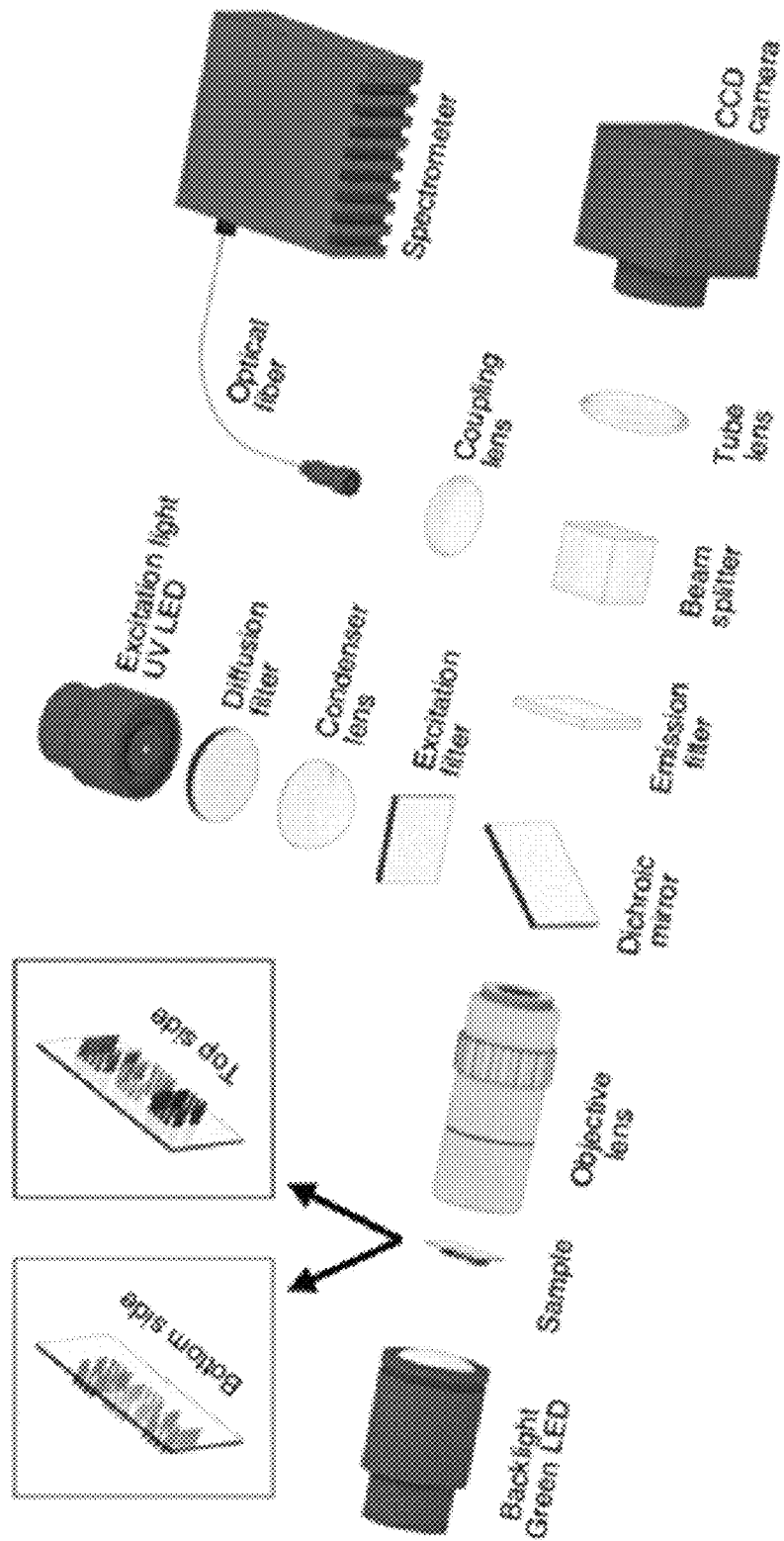
FIG. 9A to FIG. 9C are views respectively showing a sample characteristic evaluation device of a quantum dot color conversion structure, a measurement sample, and characteristic evaluation results with respect to a measurement sample.

The device of FIG. 9A is implemented by a combination of a bright-field microscope for morphology observation and an epifluorescence microscope for photographing light emission at the time of emitting light. Green light source is used as the light source of a bright-field (BF) image, and UV light is used as a light source of a photoluminescence (PL) image. Each of images is obtained with a CCD camera and a spectrometer. At this time, in connection with an arrangement of an observation sample, there may be a "Bottom Side" in which the lower side of the observation sample faces the CCD camera and the spectrometer, and a "Top Side" in which the upper side thereof faces the CCD camera and the spectrometer, and the "Bottom Side" is used herein.

The free-standing wire structure pattern is printed on the substrate by using the red, green, and blue quantum dot inks manufactured in Experimental example 1, and shapes having alphabet letters "R", "G", and "B", which respectively correspond to the colors of the ink, are printed thereon. Each of the printed free-standing wire structures has a height of 5 μm and a width of the body portion of 600 nm.

Figure 9B:
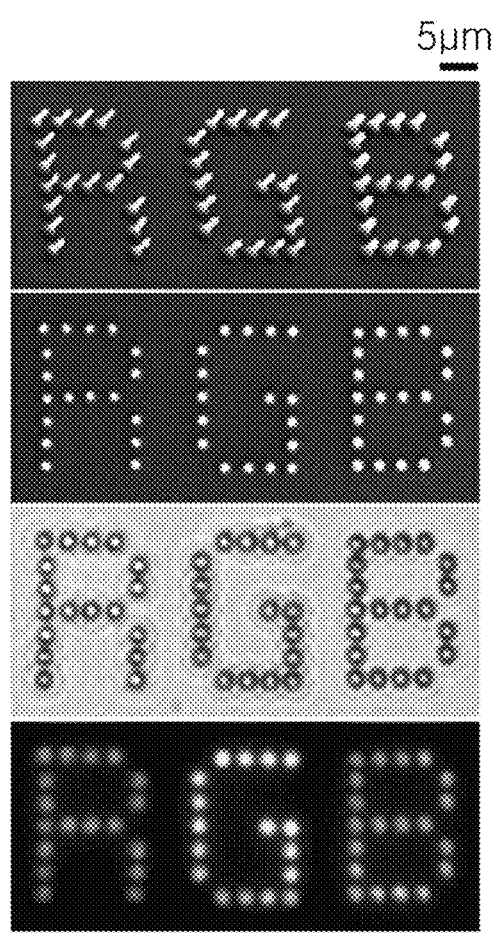

FIG. 9B is photographs taken from the printed wire structure. In FIG. 9B, the photographs, from the above, are an image photograph of a state tilted by 30 degrees, a flat image photograph, a BF image photograph from the lower side thereof, and a PL image photograph from the lower side, which is excited by UV light.

Figure 9C:
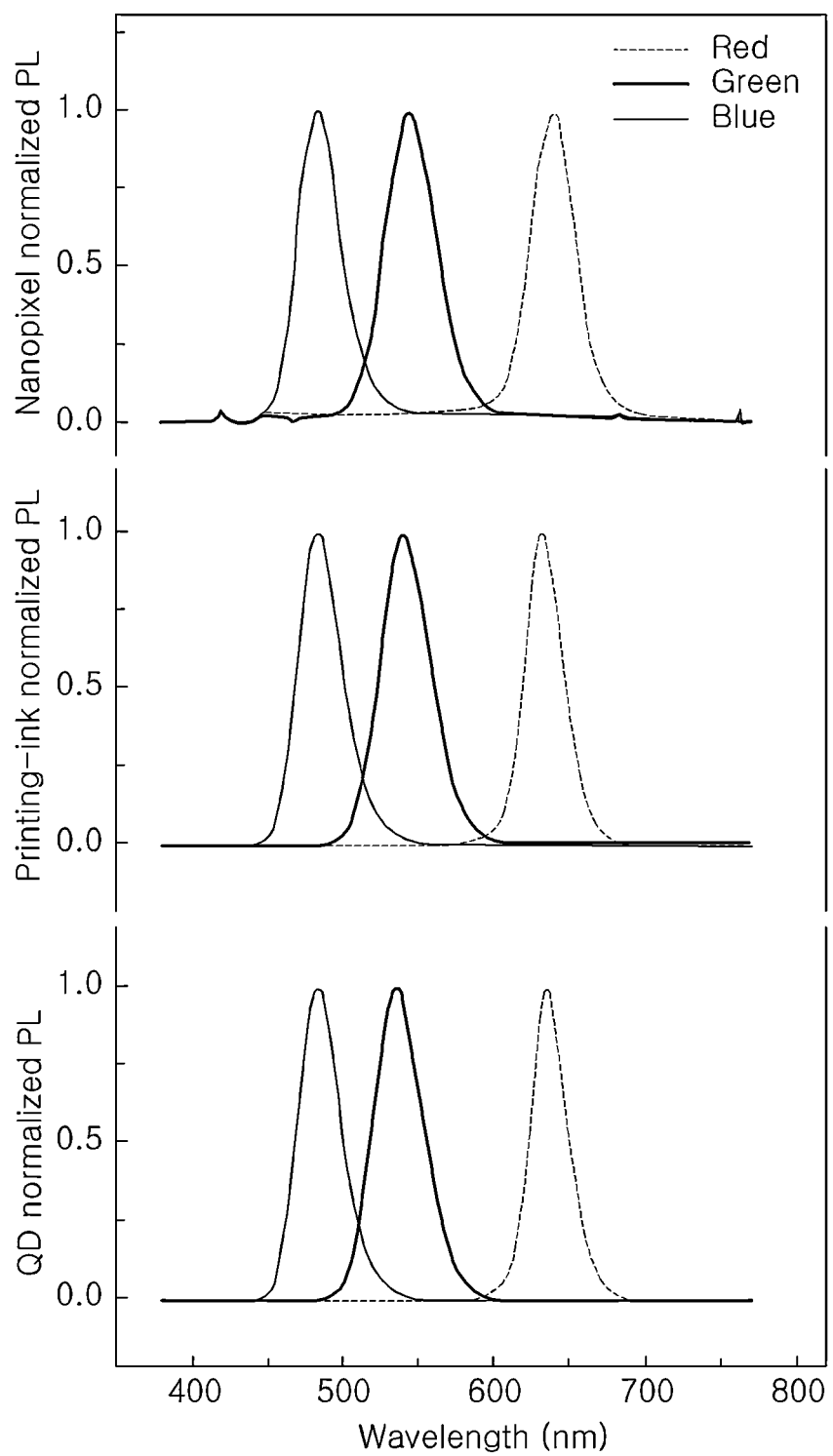

FIG. 9C is graphs showing the results of spectrum analysis.

The first graph in FIG. 9C shows the PL spectrum analysis result of the printed wire structure. The R, G, and B structure patterns have peak wavelengths of 631 nm, 540 nm, and 485 nm, respectively.

In FIG. 9C, the second graph shows a spectrum analysis result of a quantum dot ink used for printing, and the third graph shows a spectrum analysis result of a solution containing only a quantum dot powder. The spectra show that there is no significant difference between the emission characteristics of a quantum dot powder, a quantum dot ink, and a free-standing wire structure.

Experimental Example 4: Optical Properties According to Height of Quantum Dot Color Conversion Structure The brightness changes according to the height of the quantum dot color conversion structure is measured. As a measuring device, the device illustrated in FIG. 9A is used.

While changing the height of the body portion of the quantum dot color conversion structure from 2 to 10 μm in a state of fixing the width thereof at 600 nm, a quantum dot color conversion structure is manufactured, and PL characteristics are measured.

Figure 10A:
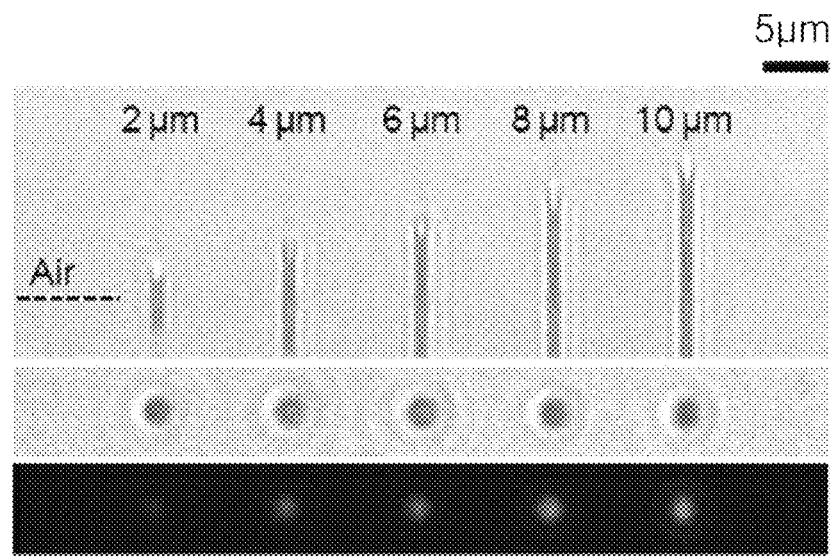
FIG. 10A and FIG. 10B are a photograph of a red quantum dot color conversion structure manufactured according to an embodiment of the present disclosure, and a graph showing characteristic evaluation results thereof.

FIG. 10A is photographs showing the brightness property measurement result according to a red quantum dot color conversion structure and the height the structure.

Figure 10B:
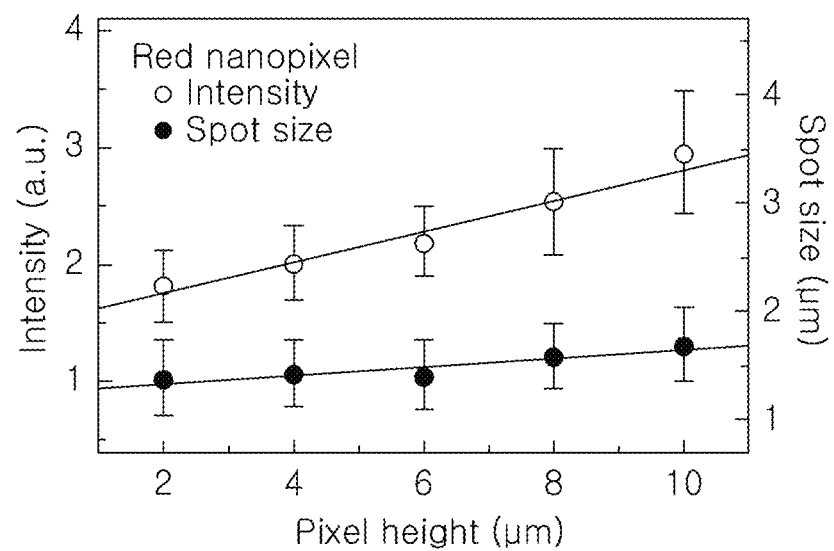

The photographs in FIG. 10A, from the above, show the front photograph, the plan photograph, and an PL image. FIG. 10B is a graph plotting measurement results of brightness and spot size of a quantum dot structure. Here, the brightness may be the sum of the brightnesses measured in the image, and the spot size may be defined as a full-width at half-maximum (FWHM) value of Gauss fitting taken from the light distribution on the PL image.

Referring to FIG. 10B, it may be known that the height and brightness of the structure have a linear proportional relationship. On the other hand, according to the spot size measurement result, it may be known that the increase in the spot size is insignificant even though the height of the structure increases.

Figure 11A:
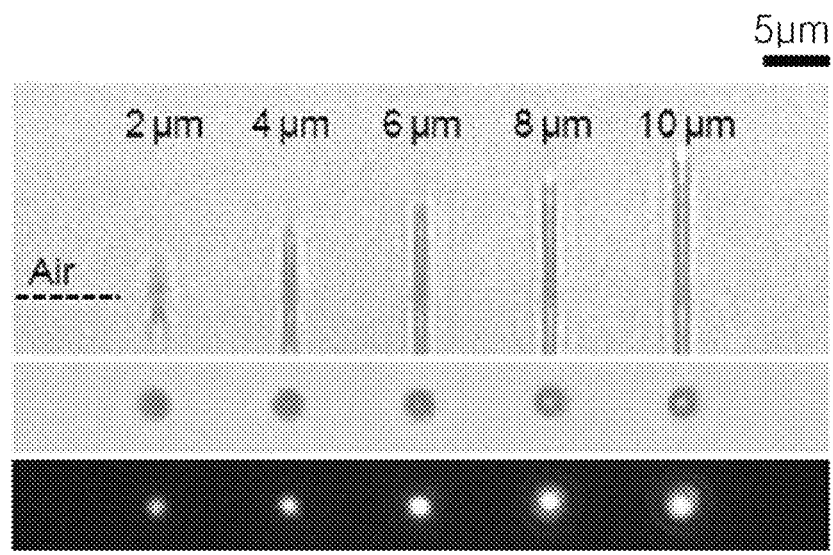
FIG. 11A and FIG. 11B are a photograph of a green quantum dot color conversion structure manufactured according to an embodiment of the present disclosure, and a graph showing characteristic evaluation results thereof.
Figure 11B:
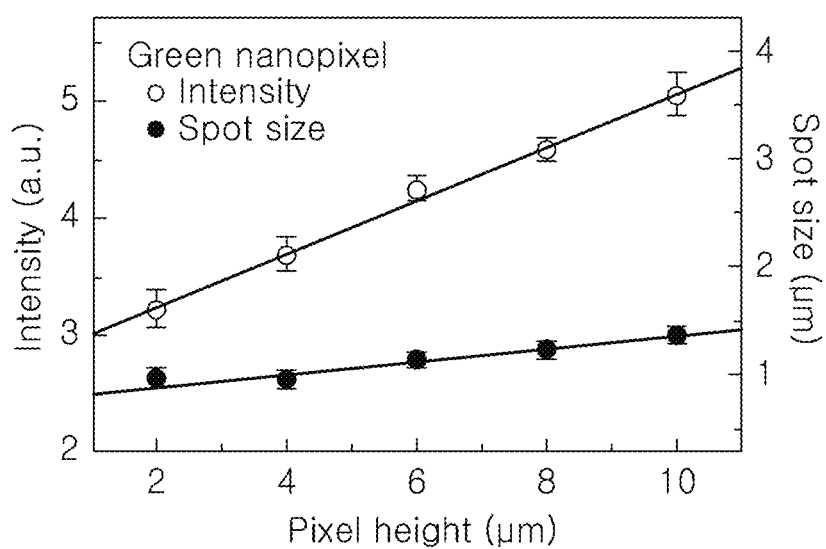
Figure 12A:
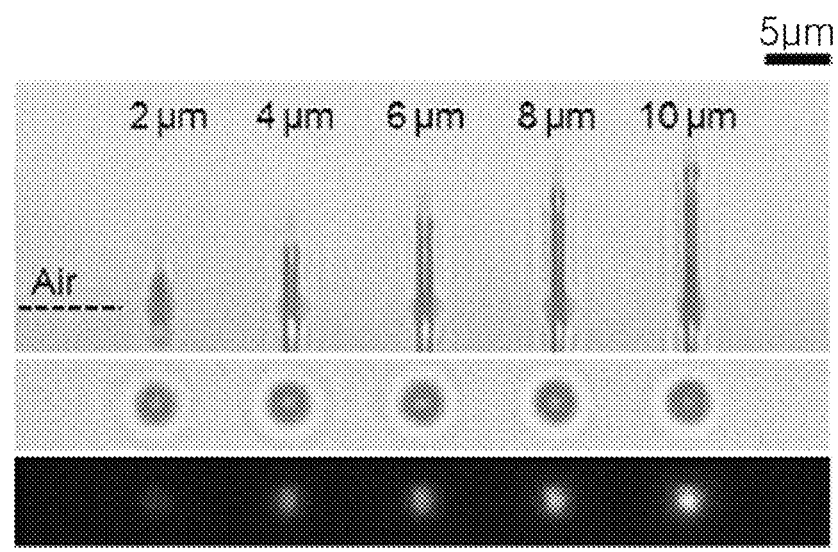
FIG. 12A and FIG. 12B are a photograph of a blue quantum dot color conversion structure manufactured according to an embodiment of the present disclosure, and a graph showing characteristic evaluation results thereof.
Figure 12B:
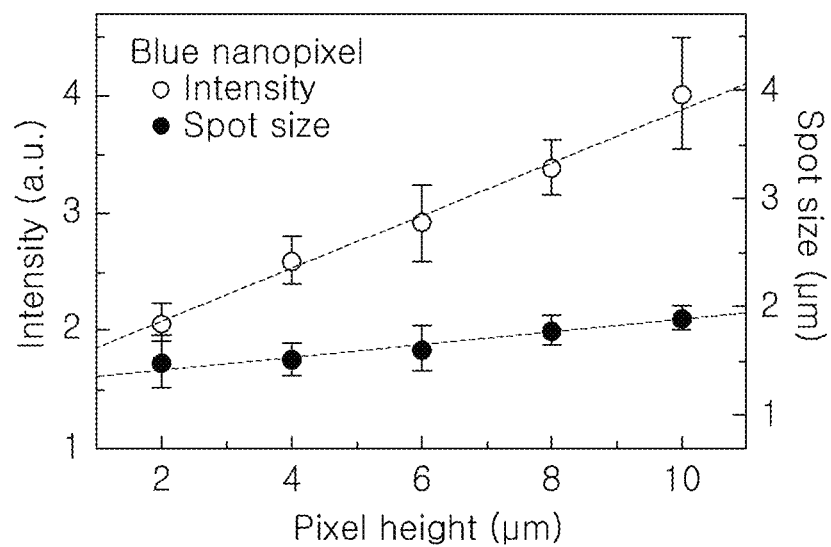

FIG. 11A and FIG. 11B are views showing the brightness property measurement result according to a green quantum dot color conversion structure and the height of the structure, and FIG. 12A and FIG. 12B are views showing the brightness property measurement result according to a blue quantum dot color conversion structure and the height of the structure. It may be known that the results illustrated in FIG. 11A to FIG. 12B have the same trend as those of FIG. 10A and FIG. 10B.

In the above, although the present disclosure has been described above through the embodiment of the present disclosure, the above description is an example of the present disclosure, and the present disclosure is not limited thereto. In addition, it should be considered that the scope of the present disclosure includes the scope which could be variously changed and implemented by a person skilled in the art, to which the disclosure belongs, without departing from the accompanying claims and the gist of the present disclosure.

INDUSTRIAL APPLICABILITY

The present disclosure may be applicable to a color conversion filter of a display.

The invention claimed is:

1. A display device including:
a backlight unit;
a drive substrate on the backlight unit;
a liquid crystal module on the drive substrate; and
a color filter on the liquid crystal module,
wherein the color filter comprises multiple quantum dot color conversion layers spaced apart from each other, wherein
the quantum dot color conversion layers are free-standing wire structures configured to extend in a vertical direction from a substrate, and
a ratio of a length to a width of the free-standing wire structures is one or more.

2. The display device of claim 1, wherein
the multiple quantum dot color conversion layers comprise:
a first free-standing structure configured to convert excitation light of a first peak wavelength into emission light of a second peak wavelength; and a second free-standing structure configured to convert excitation light of the first peak wavelength into emission light of a third peak wavelength.

3. The display device of claim 2, further comprising
a third free-standing structure configured to transmit excitation light of the first peak wavelength.

4. The display device of claim 3, further comprising
the third free-standing structure is made of a transparent material.

5. The display device of claim 1, wherein
the ratio of the length to the width is two or more.

6. The display device of claim 1, wherein
the ratio of the length to the width is five or more.

7. The display device of claim 1, wherein
the ratio of the length to the width is 10 or more.

8. The display device of claim 1, wherein
the free-standing wire structures each comprise a body portion configured to have a small width compared to a foot portion thereof.

9. The display device of claim 1, wherein
the free-standing wire structures each comprise a foot portion and a body portion configured to have substantially the same width.

10. The display device of claim 8 or claim 9, wherein
the width of the body portion is less than one micron.

* * * * *